(12) United States Patent
Sato

(10) Patent No.: US 9,046,131 B2
(45) Date of Patent: Jun. 2, 2015

(54) HYDROSTATIC GAS BEARING AND METHOD OF MANUFACTURING THE SAME

(75) Inventor: Hikaru Sato, Kanagawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 14/240,875

(22) PCT Filed: Sep. 6, 2012

(86) PCT No.: PCT/JP2012/005655
§ 371 (c)(1),
(2), (4) Date: Feb. 25, 2014

(87) PCT Pub. No.: WO2013/038625
PCT Pub. Date: Mar. 21, 2013

(65) Prior Publication Data
US 2014/0199005 A1 Jul. 17, 2014

(30) Foreign Application Priority Data

Sep. 16, 2011 (JP) .................................. 2011-202749

(51) Int. Cl.
*F16C 32/06* (2006.01)
*F16C 33/20* (2006.01)
(Continued)

(52) U.S. Cl.
CPC ........... *F16C 33/20* (2013.01); *Y10T 29/49639* (2015.01); *Y10T 29/4971* (2015.01); *F16C32/0622* (2013.01); *F16C 32/0666* (2013.01); *F16C 2370/00* (2013.01); *F16C 2326/58* (2013.01); *B21D 53/10* (2013.01); *F16C 33/208* (2013.01); *F16C 43/02* (2013.01)

(Continued)

(58) Field of Classification Search
CPC ............... F16C 29/025; F16C 32/0614; F16C 32/0618; F16C 32/0622; F16C 32/0625; F16C 32/0662; F16C 32/0666
USPC ........... 29/898.02; 384/12, 99, 100, 111, 121, 384/123
See application file for complete search history.

(56) References Cited

U.S. PATENT DOCUMENTS 3,137,530 A * 6/1964 Kohler ............................ 384/12
3,744,858 A * 7/1973 Weichsel ........................ 384/12
(Continued)

FOREIGN PATENT DOCUMENTS

JP      2001-41242      2/2001
JP      2001-56027      2/2001
(Continued)

OTHER PUBLICATIONS

International Search Report for PCT/JP2012/005655 mailed Dec. 11, 2012.

*Primary Examiner* — Phillip A Johnson
(74) *Attorney, Agent, or Firm* — Nixon & Vanderhye P.C.

(57) ABSTRACT

Including a synthetic resin-made bearing base 2 having a base portion 4, an annular protruding portion 6 provided integrally on and protruding from one surface 5 of the base portion 4, and an air supply passage 11 which is provided in the annular protruding portion 6 and the base portion 4 and which has one end 7 open at a protruding end face 8 of the annular protruding portion 6 and another end 9 open at a outer peripheral surface 10 of the base portion 4; and a synthetic resin-made bearing body 3 having an annular recessed portion 42 which is formed in one surface 41 opposing the one surface 5 of the base portion 4 and which receives the annular protruding portion 6 of the bearing base 2, an annular recessed groove 44 which is open at another surface 43, and a plurality of air outlet holes 47 serving as inherent restrictors each of which communicates with the annular recessed groove 44 at one end 45 and opens to the annular recessed portion 42 at another end 46.

9 Claims, 8 Drawing Sheets

(51) Int. Cl.
  *B21D 53/10*   (2006.01)
  *F16C 43/02*   (2006.01)

(56) References Cited

U.S. PATENT DOCUMENTS 4,073,549 A * 2/1978 Christ et al. .................. 384/122
7,682,082 B2 * 3/2010 Kane et al. .................... 384/110
2010/0303392 A1 * 12/2010 Blair et al. ...................... 384/99

FOREIGN PATENT DOCUMENTS

| | | |
|---|---|---|
| JP | 2006-510856 | 3/2006 |
| JP | 2007-247762 | 9/2007 |
| JP | 2008-82356 | 4/2008 |
| JP | 2008-82449 | 4/2008 |
| WO | WO 2004/055400 | 7/2004 |

* cited by examiner

HYDROSTATIC GAS BEARING AND METHOD OF MANUFACTURING THE SAME

This application is the U.S. national phase of International Application No. PCT/JP2012/005655 filed 6 Sep. 2012 which designated the U.S. and claims priority to JP 2011-202749 filed 16 Sep. 2011, the entire contents of each of which are hereby incorporated by reference.

TECHNICAL FIELD

The present invention relates to a hydrostatic gas bearing and a method of manufacturing the same.

BACKGROUND ART

As bearings capable of realizing ultra low friction, ultra high precision, and ultra high-speed motion, hydrostatic gas bearings are used in applications such as the conveyance of articles and ultra precision processing and ultra precision measurement by moving articles horizontally. The types of air outlet ports of this hydrostatic gas bearing include such as a porous restrictor, a surface restrictor, an orifice restrictor, and an inherent restrictor, and are respectively used depending on applications while adjusting the load capacity, the bearing rigidity, and the like.

As a gas bearing system which realizes higher damping while maintaining relatively high stiffness, a gas bearing system is proposed in Patent Document 1, for example, which comprises two opposing substantially parallel bearing surfaces and at least one gas duct for supplying gas through an orifice to a bearing gap between the bearing surfaces.

In addition, Patent Document 2 proposes a hydrostatic gas bearing which comprises: a base material constituted of a porous body; and a surface restrictor layer joined on this base material and constituted of a porous plate fabricated by adjusting the diameter and distribution of through holes so as to obtain a desired air permeation rate in advance, wherein gas is blown out through the surface restrictor layer so as to support a supported member by its static pressure.

PRIOR ART DOCUMENTS

Patent Documents

Patent Document 1: JP-T-2006-510856
Patent Document 2: JP-A-2001-56027
Patent Document 1: JP-A-2008-82449

SUMMARY OF THE INVENTION

Problems that the Invention is to Solve

Although the above-described conventional hydrostatic gas bearings are capable of realizing ultra low friction, ultra high precision, and ultra high-speed motion, since high-strength metals or ceramics are mainly used as bearing materials and it is necessary to perform high precision grinding finish and the like, such hydrostatic gas bearings have a problem in that they inevitably become expensive.

However, in cases where the situation is not such as to require ultra low friction, ultra high precision, and ultra high-speed motion, and articles such as liquid crystal screens, for instance, are conveyed in a non-contact manner, or articles are horizontally moved without causing a temperature change, the use of hydrostatic gas bearings provides advantages such as in rendering the configuration of the equipment simple, and yet since the hydrostatic gas bearings themselves are expensive, the actual condition is such that these hydrostatic gas bearings are not widely used in such applications.

In view of the above-described circumstances, in order to provide an inexpensive hydrostatic gas bearing capable of being used in various fields, the present applicant has earlier proposed a hydrostatic gas bearing comprising: a resin-made bearing member having on an upper surface thereof a plurality of inherent restrictor-shaped or orifice-shaped air outlet ports and having on a lower surface thereof an air supply groove communicating with the plurality of air outlet ports; and a base which is joined to the lower surface of the resin-made bearing member in such a manner as to cover the air supply groove and has an air supply port communicating with the air supply groove (Patent Document 3).

According to this hydrostatic gas bearing described in Patent Document 3, the resin-made bearing member for constituting the hydrostatic gas bearing can be formed by injection molding by using a metal mold to thereby render mechanical processing unnecessary, the structure of the base is such that the air supply port communicating with the resin-made bearing member is only formed, and the hydrostatic gas bearing can be assembled by merely joining the resin-made bearing member and the base. Thus, mass production of hydrostatic gas bearings is made possible, thereby making it possible to provide inexpensive hydrostatic gas bearings.

However, since the air outlet port in the hydrostatic gas bearing described in Patent Document 3 has the shape of an inherent restrictor or an orifice with a diameter of 0.2 to 0.4 mm or thereabouts, the amount of air blown out from the air outlet port is excessively large, possibly causing self-excited vibrations, so that improvements are still required in order to put such a hydrostatic gas bearing to practical use.

The present invention has been devised in view of the above-described aspects, and its object is to provide a hydrostatic gas bearing which does not cause self-excited vibrations, permits mass production, and is inexpensive, as well as a method of manufacturing the same.

Means for Solving the Problems

A hydrostatic gas bearing in accordance with the present invention comprises: a synthetic resin-made bearing base having a base portion, an annular protruding portion provided integrally on and protruding from one surface of the base portion, and an air supply passage which is provided in the annular protruding portion and the base portion and which has one end open at a protruding end face of the annular protruding portion and another end open at an outer peripheral surface of the base portion; and a synthetic resin-made bearing body having an annular recessed portion which is formed in one surface of the bearing body opposing the one surface of the base portion and which receives the annular protruding portion of the bearing base, an annular recessed groove which is open at another surface of the bearing body, and a plurality of air outlet holes serving as inherent restrictors each of which communicates with the annular recessed groove at one end thereof and opens to the annular recessed portion at another end thereof, the bearing body being integrated with the bearing base by causing an outer-side inner peripheral surface and an inner-side inner peripheral surface of the bearing body defining the annular recessed portion to be respectively welded and joined to an outer peripheral surface and an inner peripheral surface of the annular protruding portion, the annular recessed groove having a width of at least 0.3 mm and a depth of at least 0.01 mm, and each of the air outlet holes having a diameter of at least 30 μm at one end thereof and forming an inherent restrictor between the annular recessed portion and the annular recessed groove.

According to the hydrostatic gas bearing in accordance with the present invention, since the annular protruding portion of the synthetic resin-made bearing body is received by the annular recessed portion of the synthetic resin-made bearing body, and the outer peripheral surface and the inner peripheral surface of the annular protruding portion are welded and joined to the outer-side inner peripheral surface and the inner-side inner peripheral surface of the bearing body defining the annular recessed portion, the bearing body and the bearing base which are formed of a synthetic resin are firmly integrated. In addition, the synthetic resin-made bearing body has the annular recessed groove which is open at the other surface of the bearing body and the plurality of air outlet holes each of which communicates with the annular recessed groove at one end thereof and opens to the annular recessed portion at another end thereof, the annular recessed groove having a width of at least 0.3 mm and a depth of at least 0.01 mm, each of the air outlet holes having a diameter of at least 30 μm at one end thereof and forming an inherent restrictor between the annular recessed portion and the annular recessed groove; therefore, it is possible to suppress a large amount of air from being blown out from the air outlet holes, thereby making it possible to suppress the generation of self-excited vibrations attributable to the large amount of air blown out from the air outlet holes.

In a preferred embodiment, the annular recessed groove has a width of 0.3 to 1.0 mm or 0.3 to 0.7 mm and a depth of 0.01 to 0.05 mm or 0.01 to 0.03 mm, and each of the air outlet holes has a diameter of 30 to 120 μm at one end thereof.

The annular recessed groove and each of the plurality of air outlet holes are preferably formed by laser processing. The processing laser is selected from among a carbon dioxide laser, a YAG laser, a UV laser, an excimer laser, and the like.

If the annular recessed groove and each of the plurality of air outlet holes are formed by laser processing, these portions can be instantaneously formed in comparison with machining such as cutting, so that not only is mass production made possible, but hydrostatic gas bearings can be manufactured at low cost.

In the hydrostatic gas bearing in accordance with the present invention, in a preferred embodiment, the outer peripheral surface of the annular protruding portion of the bearing base has a cylindrical outer wall surface, an annular truncated conical outer wall surface which is gradually enlarged in diameter outwardly from the cylindrical outer wall surface in such a manner as to continue from the cylindrical outer wall surface, and a cylindrical outer wall surface larger in diameter than the cylindrical outer wall surface and continuous from the one surface of the base portion in such a manner as to continue from the truncated conical outer wall surface, while the inner peripheral surface of the annular protruding portion of the bearing base has a cylindrical inner wall surface, an annular truncated conical inner wall surface which is gradually reduced in diameter inwardly from the cylindrical inner wall surface in such a manner as to continue from the cylindrical inner wall surface, and a cylindrical inner wall surface smaller in diameter than the cylindrical inner wall surface and continuous from the one surface of the base portion in such a manner as to continue from the truncated conical inner wall surface. Further, the outer-side inner peripheral surface defining the annular recessed portion of the bearing body includes an outer cylindrical inner wall surface having an annular peripheral edge defining an outer edge of an open end of the annular recessed portion, while the inner-side inner peripheral surface defining the annular recessed portion of the bearing body has an inner cylindrical inner wall surface having an annular peripheral edge defining an inner edge of the open end of the annular recessed portion. Still further, the bearing body is arranged such that the outer cylindrical inner wall surface and the inner cylindrical inner wall surface are respectively fitted to the cylindrical outer wall surface of the outer peripheral surface of the annular protruding portion and the cylindrical inner wall surface of the inner peripheral surface of the annular protruding portion, and the annular peripheral edge of the outer cylindrical inner wall surface defining the outer edge of the open end of the annular recessed portion and the annular peripheral edge of the inner cylindrical inner wall surface defining the inner edge of the open end of the annular recessed portion are respectively brought into contact with the truncated conical outer wall surface of the outer peripheral surface of the annular protruding portion and the truncated conical inner wall surface of the inner peripheral surface of the annular protruding portion, and the bearing body is integrated with the bearing base by being welded and joined together at mutually contacting portions by ultrasonic welding.

In such an embodiment, since the mutually contacting portions of the bearing base and the bearing body are so-called shear joints, these portions are welded and joined by ultrasonic waves at the shear joints, so that it is possible to provide a hydrostatic gas bearing which is excellent in air-tightness, and makes it possible to obtain extremely high welding strength, and in which the bearing body and the bearing base are firmly integrated.

Moreover, in the hydrostatic gas bearing in accordance with the present invention, in another preferred embodiment, the outer peripheral surface of the annular protruding portion of the bearing base has a cylindrical outer wall surface, an annular truncated conical outer wall surface which is gradually enlarged in diameter outwardly from the cylindrical outer wall surface in such a manner as to continue from the cylindrical outer wall surface, and a cylindrical outer wall surface larger in diameter than the cylindrical outer wall surface and continuous from the one surface of the base portion in such a manner as to continue from the truncated conical outer wall surface, while the inner peripheral surface of the annular protruding portion of the bearing base has a cylindrical inner wall surface, an annular truncated conical inner wall surface which is gradually reduced in diameter inwardly from the cylindrical inner wall surface in such a manner as to continue from the cylindrical inner wall surface, and a cylindrical inner wall surface smaller in diameter than the cylindrical inner wall surface and continuous from the one surface of the base portion in such a manner as to continue from the truncated conical inner wall surface. Further, the outer-side inner peripheral surface defining the annular recessed portion of the bearing body includes an outer cylindrical inner wall surface and an outer truncated conical inner wall surface which is gradually enlarged in diameter from the outer cylindrical inner wall surface and has an annular peripheral edge defining an outer edge of an open end of the annular recessed portion, while the inner-side inner peripheral surface defining the annular recessed portion of the bearing body includes an inner cylindrical inner wall surface and an inner truncated conical inner wall surface which is gradually reduced in diameter from the inner cylindrical inner wall surface and has an annular peripheral edge defining an inner edge of the open end of the annular recessed portion. Still further, the bearing body is arranged such that the outer cylindrical inner wall surface and the inner cylindrical inner wall surface are respectively fitted to the cylindrical outer wall surface of the outer peripheral surface of the annular protruding portion and the cylindrical inner wall surface of the inner peripheral surface of the annular protruding portion, and the outer truncated conical inner wall surface and the inner truncated conical inner wall surface are respectively brought into contact with the truncated conical outer wall surface and the truncated conical inner wall surface, and the bearing body is integrated with the bearing base by being welded and joined together at mutually contacting portions by ultrasonic welding.

In such an alternative embodiment, since the mutually contacting portions of the bearing base and the bearing body are so-called scarf joints, uniform heat generation is obtained at the scarf joints and large welding areas can be obtaind, so that it is possible to provide a hydrostatic gas bearing which is excellent in airtightness and makes it possible to obtain extremely high welding strength, and in which the bearing body and the bearing base are firmly integrated.

In the hydrostatic gas bearing in accordance with the present invention, the bearing body may have, in addition to the annular recessed groove, a large-diameter annular recessed groove which is disposed on an outer side of the annular recessed groove in such a manner as to surround the annular recessed groove; a plurality of first radial recessed grooves each having one end portion open to the annular recessed groove and another end portion open to the large-diameter annular recessed groove; a small-diameter annular recessed groove which is formed on an inner side of the annular recessed groove; and a plurality of second radial recessed grooves each having one end portion open to the annular recessed groove and another end portion open to the small-diameter annular recessed groove. It is sufficient if the large-diameter annular recessed groove, the small-diameter annular recessed groove, and the first and second radial recessed grooves are formed on the one surface of the bearing body.

In the hydrostatic gas bearing in accordance with the present invention, the bearing body is preferably formed of a thermoplastic synthetic resin such as a polyacetal resin, a polyamide resin, and a polyphenylene sulfide resin, and the bearing base is preferably formed of a thermoplastic synthetic resin such as a polyacetal resin, a polyamide resin, and a polyphenylene sulfide resin, or a reinforcing filler-containing thermoplastic synthetic resin containing in such a thermoplastic synthetic resin 30 to 50% by mass of such as glass fibers, a glass powder, carbon fibers, or an inorganic filler. The bearing body and the bearing base may be formed by machining a synthetic resin material or may be formed by injection molding by using a metal mold.

A method of manufacturing a hydrostatic gas bearing constituted by a synthetic resin-made bearing base and a synthetic resin-made bearing body welded and joined to the bearing base in accordance with the present invention comprises the steps of: (a) preparing a synthetic resin-made bearing base having a base portion, an annular protruding portion provided integrally on and protruding from one surface of the base portion, and an air supply passage which is provided in the annular protruding portion and the base portion and which has one end open at a protruding end face of the annular protruding portion and another end open at an outer peripheral surface of the base portion, wherein an outer peripheral surface of the annular protruding portion has a cylindrical outer wall surface, an annular truncated conical outer wall surface which is gradually enlarged in diameter outwardly from the cylindrical outer wall surface in such a manner as to continue from the cylindrical outer wall surface, and a cylindrical outer wall surface larger in diameter than the cylindrical outer wall surface and continuous from the one surface of the base portion in such a manner as to continue from the truncated conical outer wall surface, while an inner peripheral surface of the annular protruding portion has a cylindrical inner wall surface, an annular truncated conical inner wall surface which is gradually reduced in diameter inwardly from the cylindrical inner wall surface in such a manner as to continue from the cylindrical inner wall surface, and a cylindrical inner wall surface smaller in diameter than the cylindrical inner wall surface and continuous from the one surface of the base portion in such a manner as to continue from the truncated conical inner wall surface; (b) preparing a synthetic resin-made bearing body having an annular recessed portion which is formed in one surface of the bearing body, an annular recessed groove which is open at another surface of the bearing body, and a plurality of air outlet holes each of which communicates with the annular recessed groove at one end thereof and opens to the annular recessed portion at another end thereof, wherein an outer-side inner peripheral surface defining the annular recessed portion includes an outer cylindrical inner wall surface having an annular peripheral edge defining an outer edge of an open end of the annular recessed portion, while an inner-side inner peripheral surface defining the annular recessed portion has an inner cylindrical inner wall surface having an annular peripheral edge defining an inner edge of the open end of the annular recessed portion; (c) causing the one surface of the bearing body to oppose the one surface of the base portion, causing the annular recessed portion of the bearing body to receive the annular protruding portion of the bearing base, and causing the annular peripheral edge of the outer cylindrical inner wall surface defining the outer edge of the open end of the annular recessed portion and the annular peripheral edge of the inner cylindrical inner wall surface defining the inner edge of the open end of the annular recessed portion to be respectively brought into contact with the truncated conical outer wall surface of the outer peripheral surface of the annular protruding portion and the truncated conical inner wall surface of the inner peripheral surface of the annular protruding portion, so as to form an assembly of the bearing body and the bearing base; (d) welding and joining the bearing body to the bearing base at portions of the contact by pressing a tool horn against the bearing body in the assembly and by imparting ultrasonic vibrations thereto under welding conditions of a welding pressure of 0.098 to 0.60 MPa, a vibrational amplitude of 20 to 80 μm, emitting time of 0.1 to 1.5 seconds, and a hold time of 0.5 to 1.0 second; and (e) irradiating the other surface of the bearing body welded and joined to the bearing base with a laser beam to thereby form the annular recessed groove with a width of at least 0.3 mm and a depth of at least 0.01 mm and the plurality of air outlet holes serving as inherent restrictors each of which communicates with the annular recessed groove at the one end thereof, opens to the annular recessed portion at the another end thereof, and has a diameter of at least 30 μm at the one end.

According to this manufacturing method, since shear joints are formed at mutually contacting portions of the bearing body and the bearing base of the assembly, ultrasonic welding provides excellent airtightness at the shear joints, makes it possible to obtain extremely high welding strength, and effect firm welding and integration of the bearing body and the bearing base.

Another method of manufacturing a hydrostatic gas bearing constituted by a synthetic resin-made bearing base and a synthetic resin-made bearing body welded and joined to the bearing base in accordance with the present invention comprises the steps of: (a) preparing a synthetic resin-made bearing base having a base portion, an annular protruding portion provided integrally on and protruding from one surface of the base portion, and an air supply passage which is provided in the annular protruding portion and the base portion and which has one end open at a protruding end face of the annular protruding portion and another end open at an outer peripheral surface of the base portion, wherein an outer peripheral surface of the annular protruding portion has a cylindrical outer wall surface, an annular truncated conical outer wall surface which is gradually enlarged in diameter outwardly from the cylindrical outer wall surface in such a manner as to continue from the cylindrical outer wall surface, and a cylindrical outer wall surface larger in diameter than the cylindrical outer wall surface and continuous from the one surface of the base portion in such a manner as to continue from the truncated conical outer wall surface, while an inner peripheral surface of the annular protruding portion has a cylindrical inner wall surface, an annular truncated conical inner wall surface which is gradually reduced in diameter inwardly from the cylindrical inner wall surface in such a manner as to continue from the cylindrical inner wall surface, and a cylindrical inner wall surface smaller in diameter than the cylindrical inner wall surface and continuous from the one surface of the base portion in such a manner as to continue from the truncated conical inner wall surface; (b) preparing a synthetic resin-made bearing body having an annular recessed portion which is formed in one surface of the bearing body, an annular recessed groove which is open at another surface of the bearing body, and a plurality of air outlet holes each of which communicates with the annular recessed groove at one end thereof and opens to the annular recessed portion at another end thereof, wherein an outer-side inner peripheral surface defining the annular recessed portion includes an outer cylindrical inner wall surface and an outer truncated conical inner wall surface which is gradually enlarged in diameter from the outer cylindrical inner wall surface and has an annular peripheral edge defining an outer edge of an open end of the annular recessed portion, while an inner-side inner peripheral surface defining the annular recessed portion includes an inner cylindrical inner wall surface and an inner truncated conical inner wall surface which is gradually reduced in diameter from the inner cylindrical inner wall surface and has an annular peripheral edge defining an inner edge of the open end of the annular recessed portion; (c) causing the one surface of the bearing body to oppose the one surface of the base portion, causing the annular recessed portion of the bearing body to receive the annular protruding portion of the bearing base, and causing the outer truncated conical inner wall surface and the inner truncated conical inner wall surface to be respectively brought into contact with the truncated conical outer wall surface and the truncated conical inner wall surface, so as to form an assembly of the bearing body and the bearing base; (d) welding and joining the bearing body to the bearing base at portions of the contact by pressing a tool horn against the bearing body in the assembly and by imparting ultrasonic vibrations thereto under welding conditions of a welding pressure of 0.098 to 0.60 MPa, a vibrational amplitude of 20 to 80 µm, an emitting time of 0.1 to 1.5 seconds, and a hold time of 0.5 to 1.0 second; and (e) irradiating the other surface of the bearing body welded and joined to the bearing base with a laser beam to thereby form the annular recessed groove with a width of at least 0.3 mm and a depth of at least 0.01 mm and the plurality of air outlet holes serving as inherent restrictors each of which communicates with the annular recessed groove at the one end thereof, opens to the annular recessed portion at the another end thereof, and has a diameter of at least 30 µm at the one end.

According to such other manufacturing method, since the so-called scarf joint constituted by surface contact at the truncated conical surfaces (inclined surfaces) is formed at the mutually contacting portions of the bearing body and the bearing base of the assembly, uniform heat generation is obtained by ultrasonic waves, and large welding areas are obtained. As a result, the scarf joint provides excellent airtightness, makes it possible to obtain very high welding strength, and effects firm integration of the bearing body and the bearing base.

In addition, in either manufacturing method, since the annular recessed groove and the plurality of air outlet holes are formed by a laser, it is possible to obtain a hydrostatic gas bearing which makes it possible to render machining and the like unnecessary, and which not only permits mass production but is inexpensive.

In either one of the above-described manufacturing methods, the step of irradiating the other surface of the bearing body welded and joined to the bearing base with a laser beam may be adapted to form the annular recessed groove with a width of 0.3 to 1.0 mm or 0.3 to 0.7 mm and a depth of 0.01 to 0.05 mm or 0.01 to 0.03 mm and the plurality of air outlet holes each of which communicates with the annular recessed groove at the one end thereof, opens to the annular recessed portion at the another end thereof, and has a diameter of 30 to 120 µm at the one end.

ADVANTAGES OF THE INVENTION

According to the present invention, it is possible to provide a hydrostatic gas bearing which does not cause self-excited vibrations, permits mass production, and is inexpensive, as well as a method of manufacturing the same.

MODE FOR CARRYING OUT THE INVENTION

Figure 1:
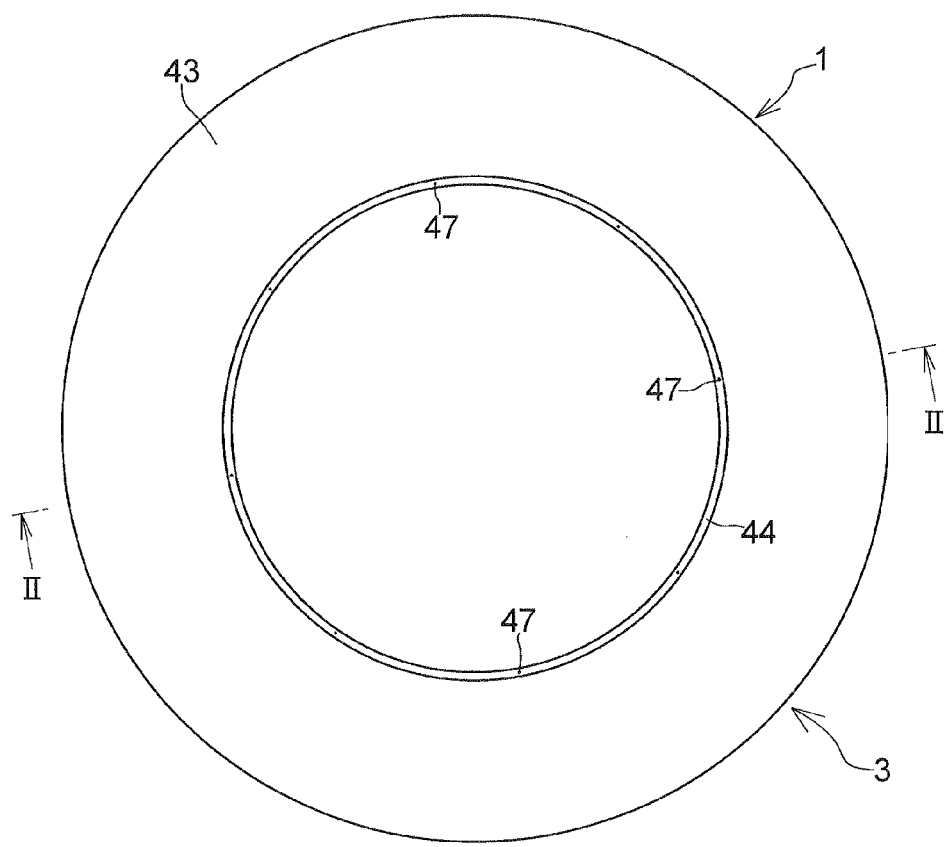
FIG. 1 is an explanatory plan view of a preferred embodiment of the invention.
Figure 2:
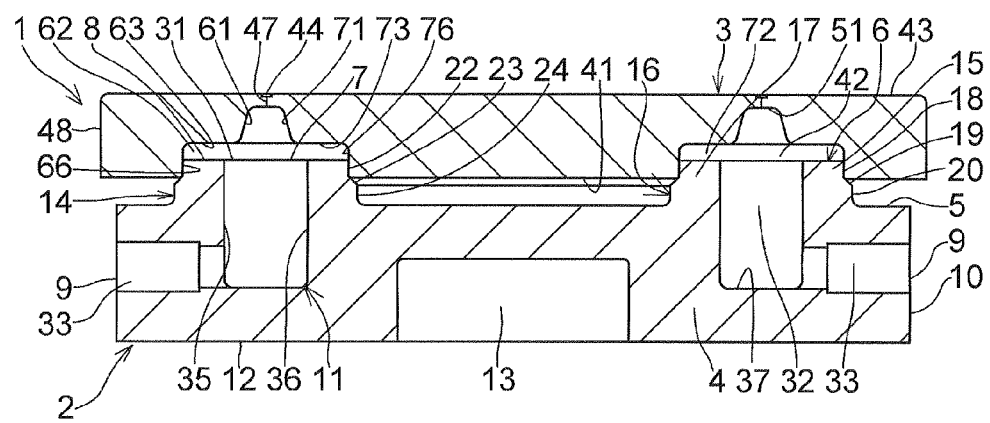
FIG. 2 is an explanatory cross-sectional view taken in the direction of arrows along line II-II of FIG. 1.
Figure 3:
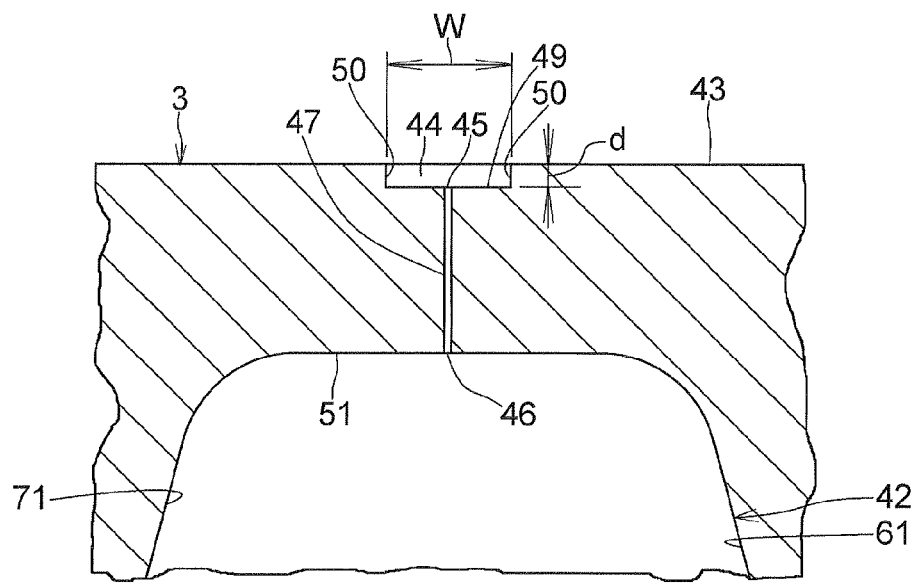
FIG. 3 is an explanatory partially enlarged cross-sectional view of FIG. 2.
Figure 4:
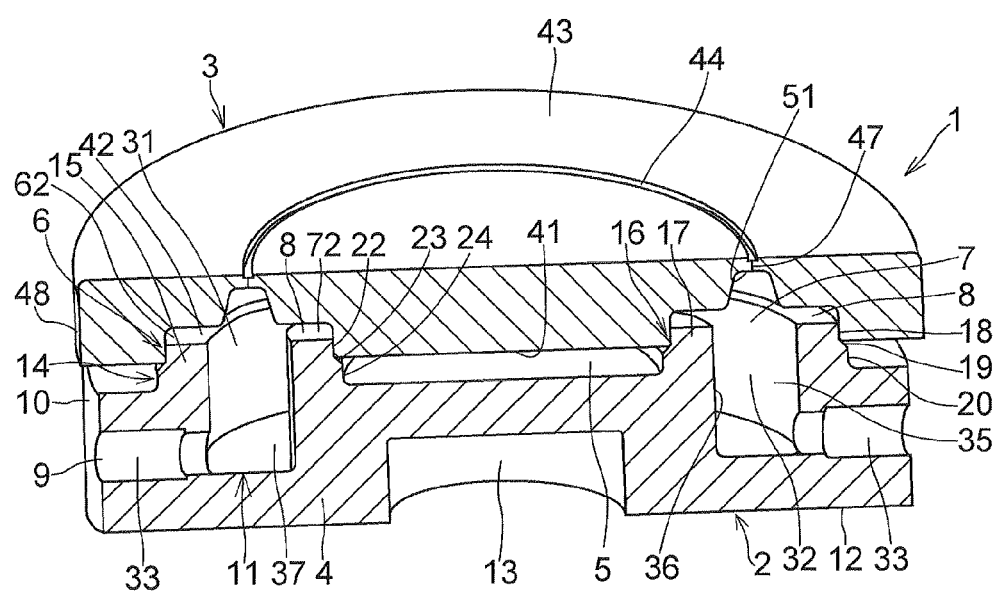
FIG. 4 is an explanatory cross-sectional perspective view of FIG. 2.
Figure 5:
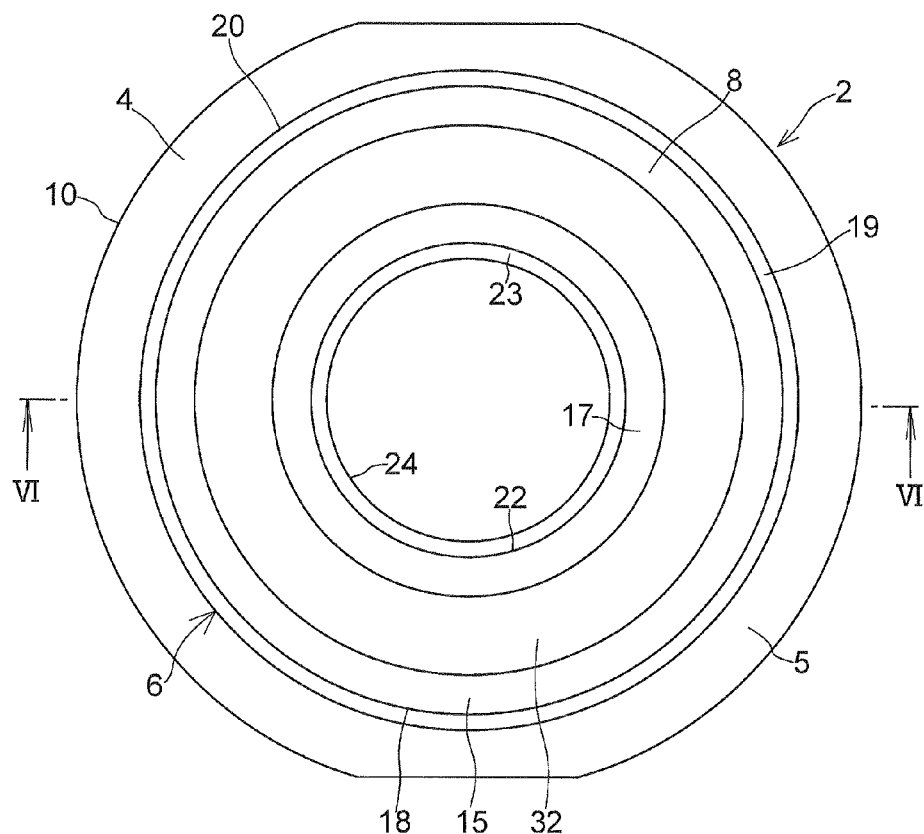
FIG. 5 is an explanatory plan view of a bearing base.
Figure 6:
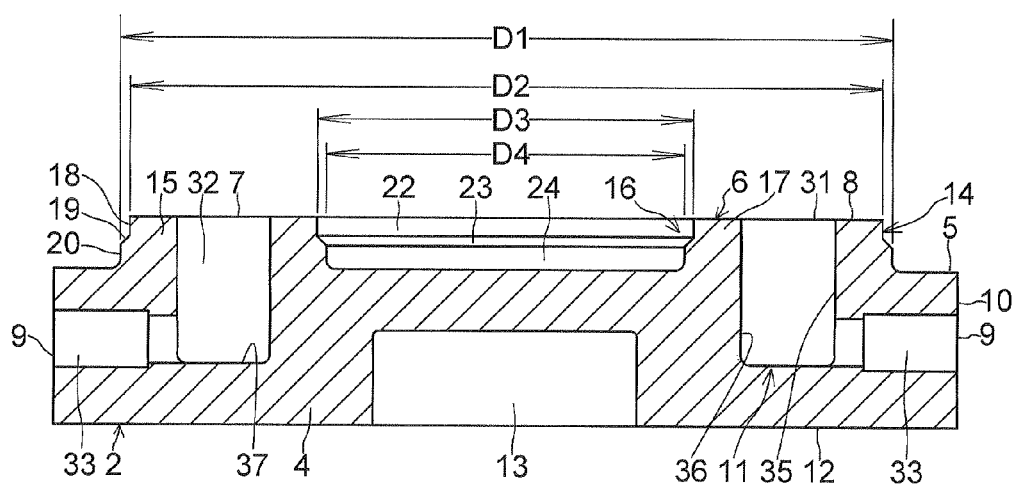
FIG. 6 is an explanatory cross-sectional view taken in the direction of arrows along line VI-VI of FIG. 5.

Hereafter, a more detailed description will be given of the present invention with reference to the preferred embodiment illustrated in the drawings. It should be noted that the present invention is not limited to the embodiment.

In FIGS. 1 to 4, a hydrostatic gas bearing 1 includes a synthetic resin-made bearing base 2 which is preferably formed of a thermoplastic synthetic resin such as a polyacetal resin, a polyamide resin, and a polyphenylene sulfide resin, or a reinforcing filler-containing thermoplastic synthetic resin containing in such a thermoplastic synthetic resin 30 to 50% by mass of such as glass fibers, a glass powder, carbon fibers, or an inorganic filler; and a synthetic resin-made bearing body 3 which is integrally welded and joined to the bearing base 2 and is preferably formed of a thermoplastic synthetic resin such as a polyacetal resin, a polyamide resin, and a polyphenylene sulfide resin.

As particularly shown in FIGS. 5 to 8, the bearing base 2 includes a base portion 4; an annular protruding portion 6 provided integrally on and protruding from one circular surface 5 of the base portion 4; an air supply passage 11 which is provided in the annular protruding portion 6 and the base portion 4 and which has one end 7 open at a protruding end face 8 of the annular protruding portion 6 and another end 9 open at a cylindrical outer peripheral surface 10 of the base portion 4; and a bottomed columnar hole 13 formed in another circular surface 12 of the base portion 4.

The annular protruding portion 6 has an outer annular protruding portion 15 having an outer peripheral surface 14 and an inner annular protruding portion 17 having an inner peripheral surface 16.

Figure 7:
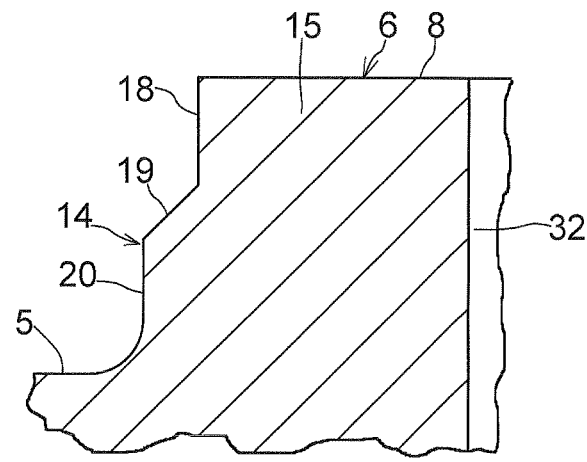
FIG. 7 is an explanatory partially enlarged cross-sectional view of FIG. 6.

As particularly shown in FIG. 7, the outer peripheral surface 14 of the outer annular protruding portion 15 has a cylindrical outer wall surface 18, an annular truncated conical outer wall surface 19 which is gradually enlarged in diameter outwardly from the cylindrical outer wall surface 18 in such a manner as to continue from the cylindrical outer wall surface 18, and a cylindrical outer wall surface 20 larger in diameter than the cylindrical outer wall surface 18 and continuous from the one surface 5 of the base portion 4 in such a manner as to continue from the truncated conical outer wall surface 19.

Figure 8:
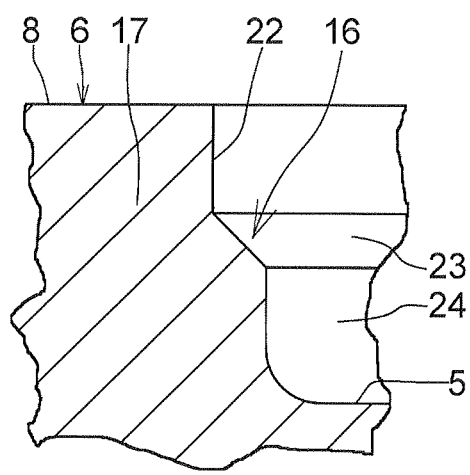
FIG. 8 is an explanatory partially enlarged cross-sectional view of FIG. 6.

As particularly shown in FIG. 8, the inner peripheral surface 16 of the inner annular protruding portion 17 has a cylindrical inner wall surface 22, an annular truncated conical inner wall surface 23 which is gradually reduced in diameter inwardly from the cylindrical inner wall surface 22 in such a manner as to continue from the cylindrical inner wall surface 22, and a cylindrical inner wall surface 24 smaller in diameter than the cylindrical inner wall surface 22 and continuous from the one surface 5 of the base portion 4 in such a manner as to continue from the truncated conical inner wall surface 23.

The air supply passage 11 provided in the bearing base 2 includes a bottomed annular recessed portion 32 which has at the one end 7 an annular opening 31 open at the protruding end face 8 and which is provided in the annular protruding portion 6 and the base portion 4, as well as a pair of air supply ports 33 provided in the base portion 4, each of the pair of air supply ports 33 having one end communicating with the annular recessed portion 32 and another end, i.e., the other end 9 of the air supply passage 11, open at the cylindrical outer peripheral surface 10 of the base portion 4.

The annular recessed portion 32 is defined by an outer cylindrical inner wall surface 35 of the base portion 4, an inner cylindrical inner wall surface 36 of the base portion 4 opposing the outer cylindrical inner wall surface 35, and an annular bottom wall surface 37 of the base portion 4. Each of the air supply ports 33 has one end which is open at the outer cylindrical inner wall surface 35 and communicates with the annular recessed portion 32.

Figure 9:
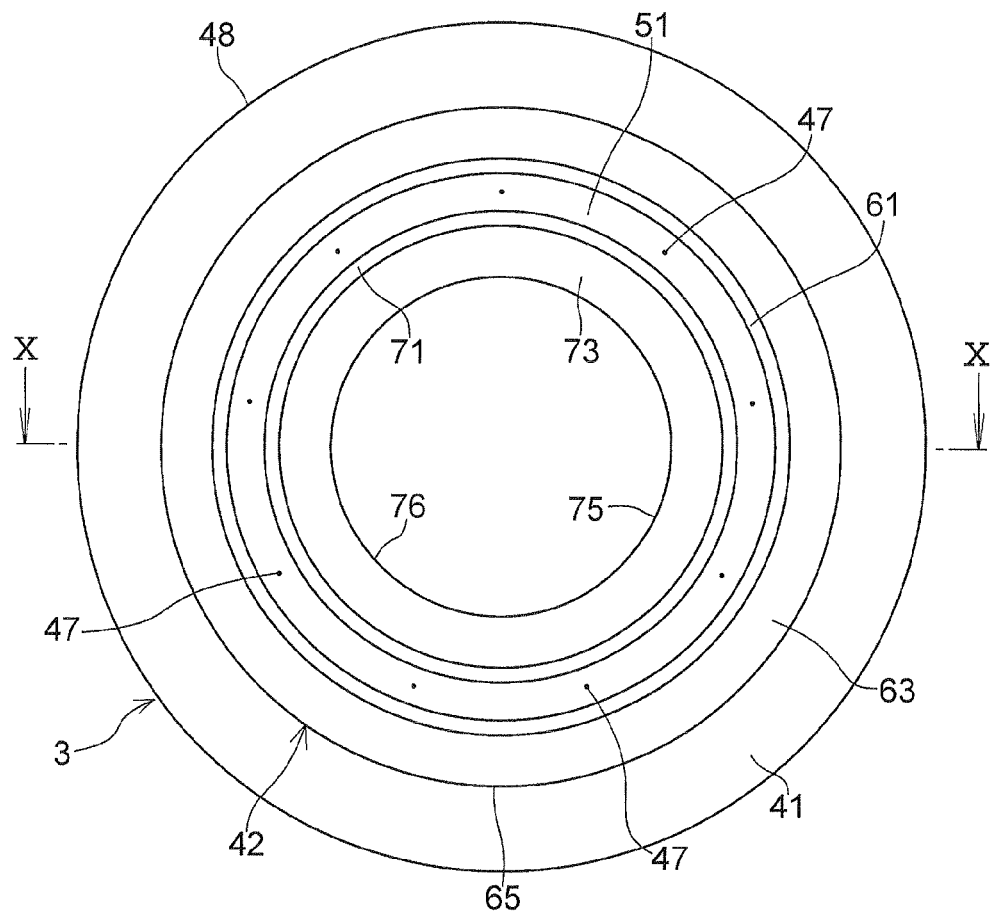
FIG. 9 is an explanatory bottom view of a bearing body.
Figure 10:
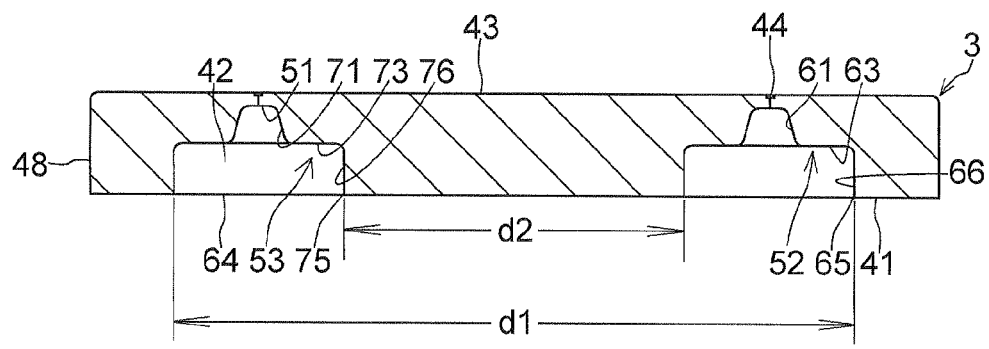
FIG. 10 is an explanatory cross-sectional view taken in the direction of arrows along line X-X of FIG. 9.

As particularly shown in FIGS. 9 and 10, the bearing body 3 includes an annular recessed portion 42 which is formed in one circular surface 41 opposing the one surface 5 of the base portion 4 and which receives the annular protruding portion 6 of the bearing base 2, an annular recessed groove 44 which is open at another circular surface 43, a plurality of air outlet holes 47 each of which communicates with the annular recessed groove 44 at one end 45 and opens to the annular recessed portion 42 at another end 46, and a cylindrical outer peripheral surface 48.

The annular recessed groove 44, which is defined by an annular surface 49 of the bearing body 3 and a mutually opposing pair of cylindrical surfaces 50, has a width W of at least 0.3 mm and a depth d of at least 0.01 mm. The air outlet hole 47 has a diameter D of at least 30 μm at its one end 45, i.e., from the one end 45 to the other end 46 in this embodiment, and forms an inherent restrictor between the annular recessed portion 42 and the annular recessed groove 44.

The annular recessed portion 42 is defined by an annular ceiling surface 51 in which the other end 46 of the air outlet hole 47 is open, an outer-side inner peripheral surface 52 continuously connected to an outer edge of the ceiling surface 51, and an inner-side inner peripheral surface 53 continuously connected to an inner edge of the ceiling surface 51.

The outer-side inner peripheral surface 52 defining the annular recessed portion 42 includes an annular truncated conical outer wall surface 61 having a small-diameter edge continuously connected to the outer edge of the ceiling surface 51, an annular stepped wall surface 63 having a small-diameter edge continuously connected to a large-diameter edge of the truncated conical outer wall surface 61 and opposing the protruding end face 8 of the outer annular protruding portion 15 with a clearance 62 therebetween, and an outer cylindrical inner wall surface 66 having a peripheral edge continuously connected to the large-diameter edge of the stepped wall surface 63 and having an annular peripheral edge 65 defining an outer edge of a circular open end 64 of the annular recessed portion 42.

The inner-side inner peripheral surface 53 defining the annular recessed portion 42 includes an annular truncated conical inner wall surface 71 having a large-diameter edge continuously connected to the inner edge of the ceiling surface 51, an annular stepped wall surface 73 having a large-diameter edge continuously connected to a small-diameter edge of the truncated conical inner wall surface 71 and opposing the protruding end face 8 of the inner annular protruding portion 17 with a clearance 72 therebetween, and an inner cylindrical inner wall surface 76 having a peripheral edge continuously connected to the small-diameter edge of the stepped wall surface 73 and having an annular peripheral edge 75 defining an inner edge of the circular open end 64 of the annular recessed portion 42.

The bearing body 3 is arranged such that the outer cylindrical inner wall surface 66 and the inner cylindrical inner wall surface 76 are respectively brought into contact with and fitted to the cylindrical outer wall surface 18 of the outer peripheral surface 14 of the outer annular protruding portion 15 and the cylindrical inner wall surface 22 of the inner peripheral surface 16 of the inner annular protruding portion 17, and the annular peripheral edge 65 of the outer cylindrical inner wall surface 66 defining the outer edge of the open end 64 of the annular recessed portion 42 and the annular peripheral edge 75 of the inner cylindrical inner wall surface 76 defining the inner edge of the open end 64 of the annular recessed portion 42 are respectively brought into contact with the truncated conical outer wall surface 19 of the outer peripheral surface 14 of the outer annular protruding portion 15 and the truncated conical inner wall surface 23 of the inner peripheral surface 16 of the inner annular protruding portion 17. Through the ultrasonic welding or so-called shear joint of mutually contacting portions, i.e., contacting portions of the peripheral edge 65 and the truncated conical outer wall surface 19 and contacting portions of the peripheral edge 75 and the truncated conical inner wall surface 23, the bearing body 3 is integrated with the bearing base 2 by being welded and joined together at the contacting portions of the outer cylindrical inner wall surface 66 and the cylindrical outer wall surface 18 and the contacting portions of the inner cylindrical inner wall surface 76 and the cylindrical inner wall surface 22, in addition to the contacting portions of the peripheral edge 65 and the truncated conical outer wall surface 19 and the contacting portions of the peripheral edge 75 and the truncated conical inner wall surface 23.

In the hydrostatic gas bearing 1, the annular recessed groove 44 in which the width W at the surface 43 of the bearing body 3 is at least 0.3 mm and the depth d is at least 0.01 mm and the plurality of air outlet holes 47 formed in the shape of inherent restrictors, each of which is open at the one end 45 to the annular recessed groove 44, is open at the other end 46 to the annular recessed portion 42 and has a diameter of at least 30 µm, may be instantaneously formed by, for example, laser processing.

With the above-described hydrostatic gas bearing 1, the bearing body 3 is instantaneously welded and joined to the bearing base 2 with airtightness by ultrasonic welding at the contacting portions of the peripheral edge 65 and the truncated conical outer wall surface 19, the contacting portions of the peripheral edge 75 and the truncated conical inner wall surface 23, the contacting portions of the outer cylindrical inner wall surface 66 and the cylindrical outer wall surface 18, and the contacting portions of the inner cylindrical inner wall surface 76 and the cylindrical inner wall surface 22. Therefore, not only is mass production made possible, but the cost can be lowered.

Figure 11:
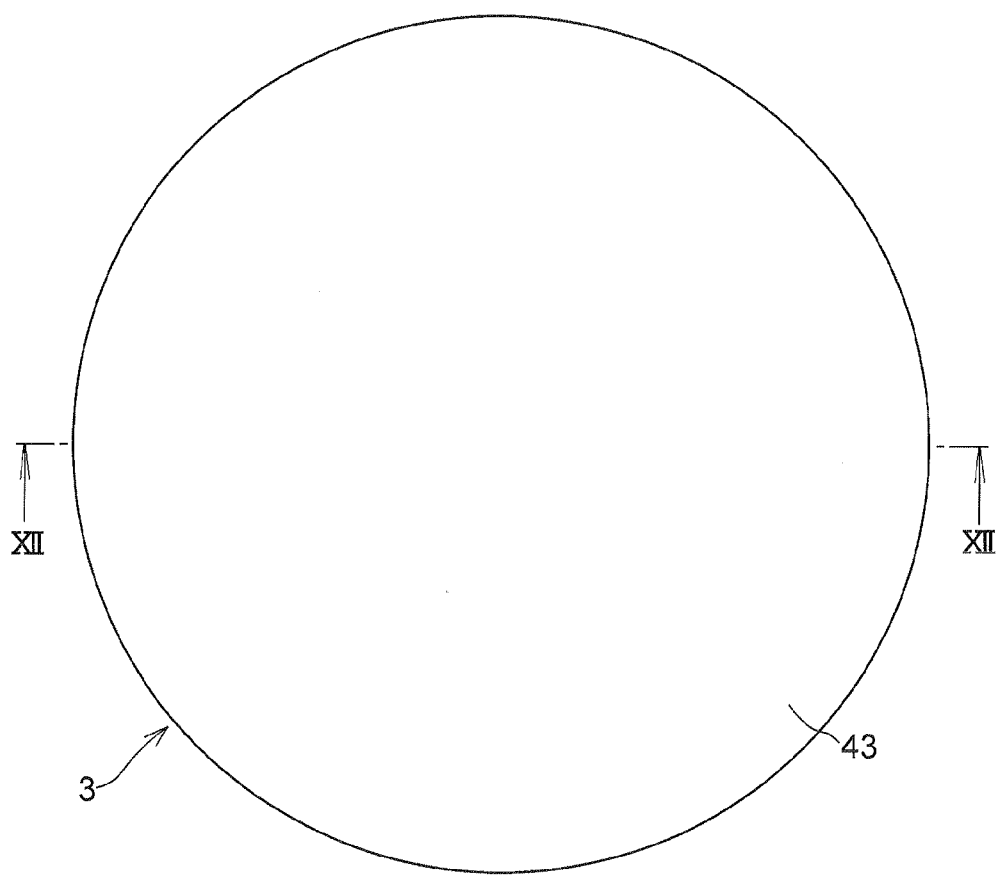
FIG. 11 is an explanatory plan view of an assembly of the bearing body and the bearing base.
Figure 12:
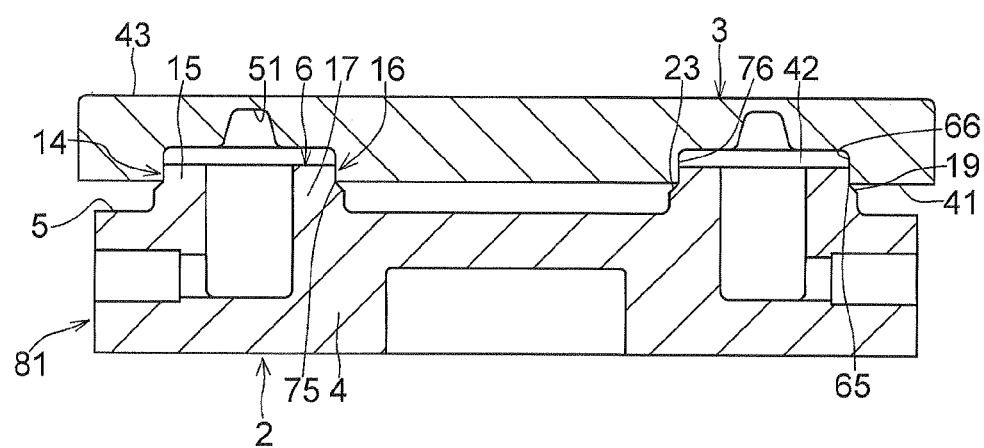
FIG. 12 is an explanatory cross-sectional view taken in the direction of arrows along line XII-XII of FIG. 11.
Figure 13:
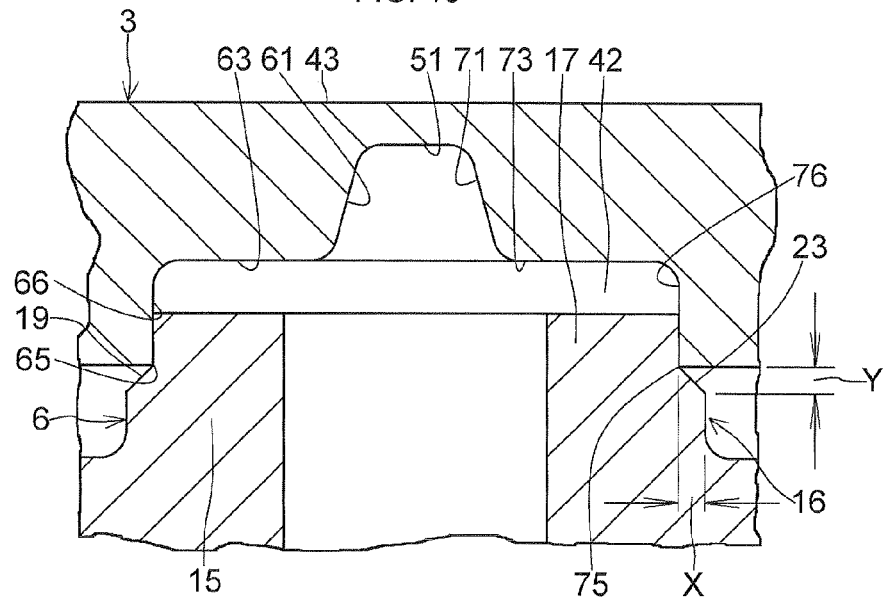
FIG. 13 is an explanatory partially enlarged cross-sectional view of FIG. 12.

Next, a description will be given of an embodiment of the method of manufacturing the hydrostatic gas bearing 1 shown in FIGS. 1 to 4. First, the synthetic resin-made bearing base 2, such as the one shown in FIGS. 5 to 8, and the synthetic resin-made bearing body 3, such as the one shown in FIGS. 9 and 10 in which the annular recessed groove 44 and the plurality of air outlet holes 47 have not been formed, are prepared. Then, as shown in FIGS. 11 to 13, an assembly 81 of the bearing body 3 and the bearing base 2 is formed by causing the one surface 41 of the bearing body 3 to oppose the one surface 5 of the base portion 4 and causing the annular recessed portion 42 of the bearing body 3 to receive the annular protruding portion 6 of the bearing base 2, and by causing the annular peripheral edge 65 of the outer cylindrical inner wall surface 66 defining the outer edge of the open end 64 of the annular recessed portion 42 and the annular peripheral edge 75 of the inner cylindrical inner wall surface 76 defining the inner edge of the open end 64 of the annular recessed portion 42 to be respectively brought into contact with the truncated conical outer wall surface 19 of the outer peripheral surface 14 of the outer annular protruding portion 15 and the truncated conical inner wall surface 23 of the inner peripheral surface 16 of the inner annular protruding portion 17.

A tool horn (not shown) is pressed against the surface 43 of the bearing body 3 in the assembly 81, and ultrasonic vibrations are thereby imparted thereto under the welding conditions of a welding pressure of 0.098 to 0.60 MPa, a vibrational amplitude of 20 to 80 µm, an emitting time of 0.1 to 1.5 seconds, and a hold time of 0.5 to 1.0 second so as to effect welding joining with a welding allowance X in a radial direction and a welding allowance Y in a penetrating direction in shear joints at the contacting portions of the peripheral edge 65 and the truncated conical outer wall surface 19 and at the contacting portions of the peripheral edge 75 and the truncated conical inner wall surface 23, thereby joining and integrating the bearing base 2 and the bearing body 3.

Here, a description will be given of an embodiment in which the assembly 81 of the bearing base 2 and the bearing body 3 with the following dimensional specifications was subjected to ultrasonic welding under the following welding conditions by assuming that the diameter of the cylindrical outer wall surface 20 of the outer annular protruding portion 15 of the bearing base 2 formed of a polyphenylene sulfide resin containing 30% by mass of glass fibers was D1, the diameter of the cylindrical outer wall surface 18 was D2, the diameter of the cylindrical inner wall surface 22 of the inner annular protruding portion 17 was D3, and the diameter of the cylindrical inner wall surface 24 was D4, and that the diameter of the outer cylindrical inner wall surface 66 of the annular recessed portion 42 of the bearing body 3 formed of a polyphenylene sulfide resin was d1, and the diameter of the inner cylindrical inner wall surface 76 of the annular recessed portion 42 was d2.

<Dimensional Specifications>

D1 (diameter of the cylindrical outer wall surface 20): φ41 mm (tolerance: +0.1, 0)

D2 (diameter of the cylindrical outer wall surface 18): φ40 mm (tolerance: 0, −0.05)

D3 (diameter of the cylindrical inner wall surface 22): φ20 mm (tolerance: 0.05, 0)

D4 (diameter of the cylindrical inner wall surface 23): φ19 mm (tolerance: 0, −0.1)

d1 (diameter of the outer cylindrical inner wall surface 66): φ40 mm (tolerance: +0.10, +0.05)

d2 (diameter of the inner cylindrical inner wall surface 76): φ20 mm (tolerance: −0.05, −0.10)

<Welding Conditions>

Welding pressure: 0.1 MPa

Vibrational amplitude: 40 µm

Emitting time: 0.5 second

Hold time: 0.5 second

It was confirmed that the assembly 81 of the bearing base 2 and the bearing body 3 subjected to ultrasonic welding under the aforementioned dimensional specifications and welding conditions was welded and joined with good airtightness at the joined portions of the peripheral edge 65 and the truncated conical outer wall surface 19 and at the joined portions of the peripheral edge 75 and the truncated conical inner wall surface 23, and was joined and integrated with high welding strength.

The surface 43 of the bearing body 3 in the assembly 81 thus joined and integrated was irradiated with a laser beam by a laser processing machine, thereby forming the annular recessed groove 44 with the width W of at least 0.3 to 1.0 mm and the depth d of 0.01 to 0.05 mm and forming at the annular surface 49 for defining the annular recessed groove 44 the plurality of air outlet holes 47 formed in the shape of inherent restrictors, each of which extends through the bearing body 3 from the annular surface 49, is open at the ceiling surface 51 to the annular recessed portion 42, and has a diameter of at least 30 µm, preferably 30 to 120 µm.

The processing laser which is used is selected from among a carbon dioxide laser, a YAG laser, a UV laser, an excimer laser, and the like, but a carbon dioxide laser is preferably used.

The annular recessed groove 44 having a width of 0.5 mm and a depth of 0.05 mm about a 30 mm diameter circular arc could be formed and processed on the surface 43 of the bearing body 3, which was formed of a polyphenylene sulfide resin, at a scan speed of 1000 mm/s, in one-time superposed printing, and in a processing time of 2 seconds by using a carbon dioxide laser with a laser output of 9.5 W. Additionally, in the annular surface 49 of the annular recessed groove 44, 10 air outlet holes 47 formed in the shape of inherent restrictors, each of which extended through the bearing body 3 from the annular surface 49, was open at the ceiling surface 51 to the annular recessed portion 42, and had a diameter of 0.065 mm, could be processed at 10 circumferentially equally distributed positions with a laser output of 14 W and in a processing time of 15 seconds.

Figure 14:
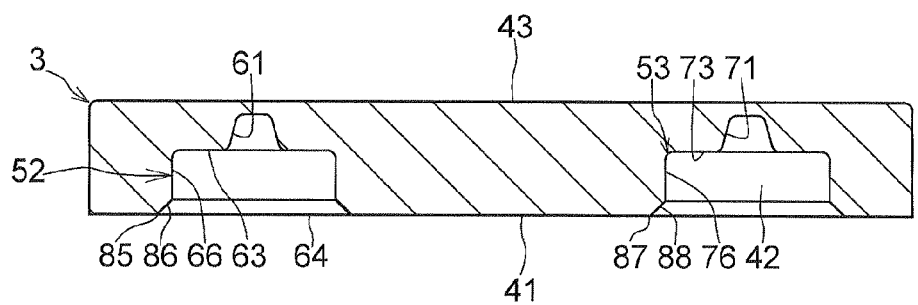
FIG. 14 is an explanatory cross-sectional view of another embodiment of the bearing body.
Figure 15:
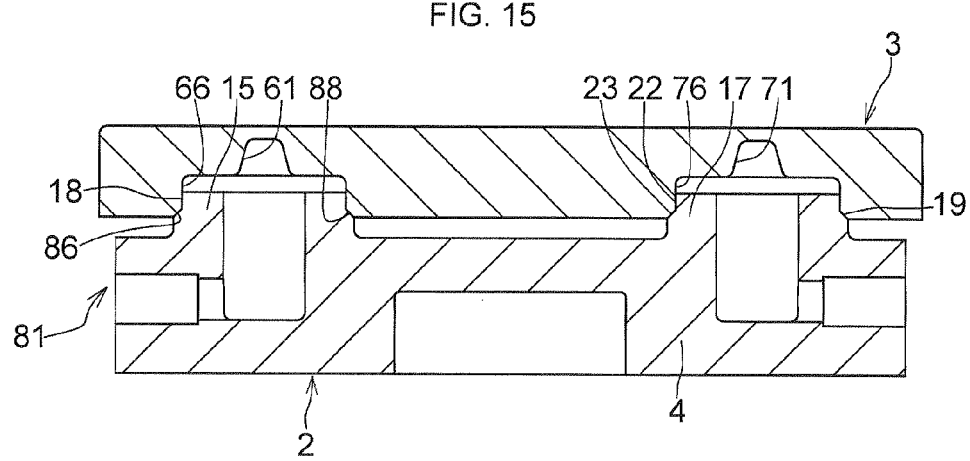
FIG. 15 is an explanatory cross-sectional view of another preferred embodiment of the invention.
Figure 16:
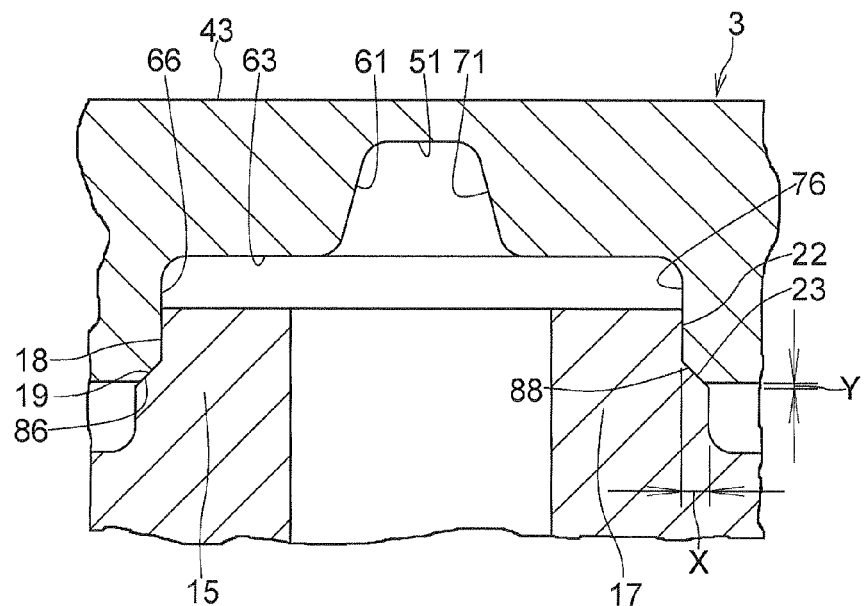
FIG. 16 is an explanatory partially enlarged cross-sectional view of FIG. 15.

In the above-described embodiment, the outer-side inner peripheral surface 52 of the bearing body 3 has the truncated conical outer wall surface 61, the stepped wall surface 63, and the outer cylindrical inner wall surface 66, while the inner-side inner peripheral surface 53 of the bearing body 3 has the truncated conical inner wall surface 71, the stepped wall surface 73, and the inner cylindrical inner wall surface 76. Alternatively, however, as shown in FIGS. 14 to 16, the outer-side inner peripheral surface 52 may have, in addition to the truncated conical outer wall surface 61, the stepped wall surface 63, and the outer cylindrical inner wall surface 66, an outer truncated conical inner wall surface 86 which is continuously connected to one end of the outer cylindrical inner wall surface 66, is gradually enlarged in diameter from that one end, and has an annular peripheral edge 85 defining the outer edge of the open end 64 of the annular recessed portion 42, whereas the inner-side inner peripheral surface 53 may have, in addition to the truncated conical inner wall surface 71, the stepped wall surface 73, and the inner cylindrical inner wall surface 76, an inner truncated conical inner wall surface 88 which is continuously connected to one end of the inner cylindrical inner wall surface 76, is gradually reduced in diameter from that one end, and has an annular peripheral edge 87 defining the inner edge of the open end 64 of the annular recessed portion 42. In the hydrostatic gas bearing 1 shown in FIGS. 14 to 16, the bearing body 3 is arranged such that the outer cylindrical inner wall surface 66 and the inner cylindrical inner wall surface 76 are respectively fitted to the cylindrical outer wall surface 18 of the outer peripheral surface 14 of the outer annular protruding portion 15 and the cylindrical inner wall surface 22 of the inner peripheral surface 16 of the inner annular protruding portion 17, and the outer truncated conical inner wall surface 86 and the inner truncated conical inner wall surface 88 are respectively brought into contact with the truncated conical outer wall surface 19 and the truncated conical inner wall surface 23. Through the ultrasonic welding or so-called scarf joint (a welding allowance X in an axial direction and a welding allowance Y in a penetrating direction) of mutually contacting portions, i.e., contacting portions of the outer truncated conical inner wall surface 86 and the truncated conical outer wall surface 19 and contacting portions of the inner truncated conical inner wall surface 88 and the truncated conical inner wall surface 23, the bearing body 3 is integrated with the bearing base 2 by being welded and joined together at the contacting portions of the outer truncated conical inner wall surface 86 and the truncated conical outer wall surface 19 and the contacting portions of the inner truncated conical inner wall surface 88 and the truncated conical inner wall surface 23.

According to the hydrostatic gas bearing 1 shown in FIGS. 14 to 16, since the so-called scarf joint constituted by surface contact (inclined surface contact) is formed at the contacting portions of the outer truncated conical inner wall surface 86 and the truncated conical outer wall surface 19 and the contacting portions of the inner truncated conical inner wall surface 88 and the truncated conical inner wall surface 23, uniform heat generation is obtained by the surface contact (inclined surface contact) in ultrasonic welding, and large welding areas are obtained. As a result, the scarf joint provides excellent airtightness, makes it possible to obtain very high welding strength, and effects firm integration of the bearing body 3 and the bearing base 2.

To manufacture the hydrostatic gas bearing 1 shown in FIGS. 14 to 16, the synthetic resin-made bearing base 2 shown in FIGS. 5 to 8 and the bearing body 3 shown in FIG. 14 are prepared. Then, as shown in FIGS. 15 and 16, an assembly 81 of the bearing body 3 and the bearing base 2 is formed by causing the one surface 41 of the bearing body 3 to oppose the one surface 5 of the base portion 4 and causing the annular recessed portion 42 of the bearing body 3 to receive the annular protruding portion 6 of the bearing base 2, and by causing the outer truncated conical inner wall surface 86 and the inner truncated conical inner wall surface 88 to be respectively brought into contact with the truncated conical outer wall surface 19 and the truncated conical inner wall surface 23. Thereafter, the welding and joining of the contacting portions of the outer truncated conical inner wall surface 86 and the truncated conical outer wall surface 19 and the contacting portions of the inner truncated conical inner wall surface 88 and the truncated conical inner wall surface 23 and the formation of the annular recessed groove 44 and the plurality of air outlet holes 47 are carried out by the imparting of ultrasonic vibrations and laser irradiation in the same way as described above.

Figure 17:
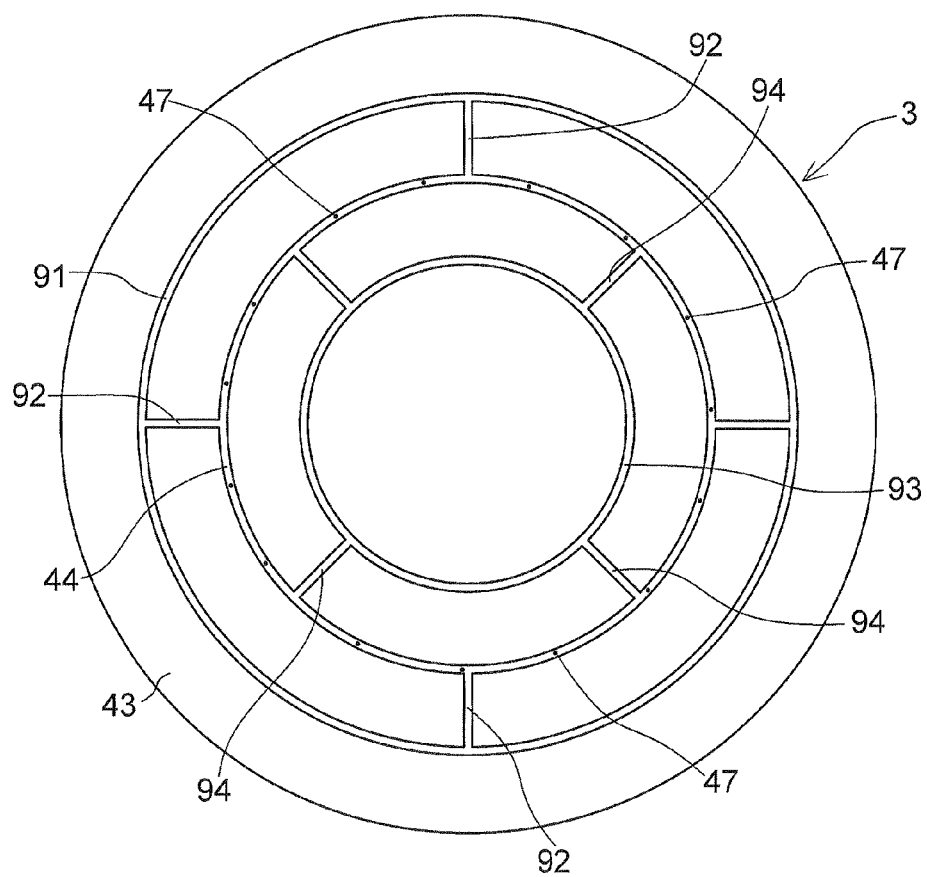
FIG. 17 is an explanatory plan view of still another embodiment of the bearing body.

Furthermore, although the bearing body 3 of the above-described hydrostatic gas bearing 1 has one annular recessed groove 44, as shown in FIG. 17, the bearing body 3 may have, in addition to the annular recessed groove 44, a large-diameter annular recessed groove 91 which is formed in the one surface 43 of the bearing body 3, is disposed on the outer side of the annular recessed groove 44 in such a manner as to surround the annular recessed groove 44, and is concentric with the annular recessed groove 44; a plurality of radial recessed grooves 92 each having one end portion open to the annular recessed groove 44 and another end portion open to the large-diameter annular recessed groove 91; a small-diameter annular recessed groove 93 which is formed on the inner side of the annular recessed groove 44 and is concentric with the annular recessed groove 44; and a plurality of radial recessed grooves 94 each having one end portion open to the annular recessed groove 44 and another end portion open to the small-diameter annular recessed groove 93.

With the hydrostatic gas bearing 1 having the bearing body 3 shown in FIG. 17, since air which is fed to the annular recessed groove 44 is supplied to the large-diameter annular recessed groove 91 and the small-diameter annular recessed groove 93 through the radial recessed grooves 92 and 94, the supply area becomes large, so that stable floating can be effected in the floatation of articles.

As described above, since the bearing body and the bearing base are formed by injection molding by using a metal mold, machining is not required, and the synthetic resin-made bearing body has the inner and outer peripheral surfaces of the annular recessed portion respectively insertingly fitted on the inner and outer peripheral surfaces of the annular protruding portion of the bearing base, and is integrally welded and joined firmly to the bearing base at the contacting portions. In addition, since the annular recessed groove with a width of at least 0.3 mm and a depth of at least 0.01 mm and the plurality of air outlet holes formed in the shape of inherent restrictors each having a diameter of at least 30 μm are formed in the bearing body, it is possible to suppress a large amount of air from being blown out from the air outlet holes, thereby making it possible to suppress the generation of self-excited vibrations attributable to the blowing out of a large amount of air from the air outlet holes. Thus, it is possible to provide a hydrostatic gas bearing which not only permits mass production but is inexpensive as well as a method of manufacturing the same.

DESCRIPTION OF REFERENCE NUMERALS AND SIGNS

1: hydrostatic gas bearing
2: bearing base
3: bearing body

The invention claimed is:

1. A hydrostatic gas bearing comprising: a synthetic resin-made bearing base having a base portion, an annular protruding portion provided integrally on and protruding from one surface of the base portion, and an air supply passage which is provided in the annular protruding portion and the base portion and which has one end open at a protruding end face of the annular protruding portion and another end open at an outer peripheral surface of the base portion; and a synthetic resin-made bearing body having an annular recessed portion which is formed in one surface of the bearing body opposing the one surface of the base portion and which receives the annular protruding portion of said bearing base, an annular recessed groove which is open at another surface of the bearing body, and a plurality of air outlet holes serving as inherent restrictors each of which communicates with the annular recessed groove at one end thereof and opens to the annular recessed portion at another end thereof, said bearing body being integrated with said bearing base by causing an outer-side inner peripheral surface and an inner-side inner peripheral surface of said bearing body defining the annular recessed portion to be respectively welded and joined to an outer peripheral surface and an inner peripheral surface of the annular protruding portion, the annular recessed groove having a width of at least 0.3 mm and a depth of at least 0.01 mm, and each of the air outlet holes having a diameter of at least 30 μm at one end thereof and forming an inherent restrictor between the annular recessed portion and the annular recessed groove.

2. The hydrostatic gas bearing according to claim 1, wherein the annular recessed groove has a width of 0.3 to 1.0 mm or 0.3 to 0.7 mm and a depth of 0.01 to 0.05 mm or 0.01 to 0.03 mm, and each of the air outlet holes has a diameter of 30 to 120 μm at one end thereof.

3. The hydrostatic gas bearing according to claim 1, wherein the annular recessed groove and each of the air outlet holes are formed by laser processing.

4. The hydrostatic gas bearing according to claim 1, wherein the outer peripheral surface of the annular protruding portion of said bearing base has a cylindrical outer wall surface, an annular truncated conical outer wall surface which is gradually enlarged in diameter outwardly from the cylindrical outer wall surface in such a manner as to continue from the cylindrical outer wall surface, and a cylindrical outer wall surface larger in diameter than the cylindrical outer wall surface and continuous from the one surface of the base portion in such a manner as to continue from the truncated conical outer wall surface, while the inner peripheral surface of the annular protruding portion of said bearing base has a cylindrical inner wall surface, an annular truncated conical inner wall surface which is gradually reduced in diameter inwardly from the cylindrical inner wall surface in such a manner as to continue from the cylindrical inner wall surface, and a cylindrical inner wall surface smaller in diameter than the cylindrical inner wall surface and continuous from the one surface of the base portion in such a manner as to continue from the truncated conical inner wall surface, wherein the outer-side inner peripheral surface defining the annular recessed portion of said bearing body includes an outer cylindrical inner wall surface having an annular peripheral edge defining an outer edge of an open end of the annular recessed portion, while the inner-side inner peripheral surface defining the annular recessed portion of said bearing body has an inner cylindrical inner wall surface having an annular peripheral edge defining an inner edge of the open end of the annular recessed portion, and wherein said bearing body is arranged such that the outer cylindrical inner wall surface and the inner cylindrical inner wall surface are respectively fitted to the cylindrical outer wall surface of the outer peripheral surface of the annular protruding portion and the cylindrical inner wall surface of the inner peripheral surface of the annular protruding portion, and the annular peripheral edge of the outer cylindrical inner wall surface defining the outer edge of the open end of the annular recessed portion and the annular peripheral edge of the inner cylindrical inner wall surface defining the inner edge of the open end of the annular recessed portion are respectively brought into contact with the truncated conical outer wall surface of the outer peripheral surface of the annular protruding portion and the truncated conical inner wall surface of the inner peripheral surface of the annular protruding portion, and said bearing body is integrated with said bearing base by being welded and joined together at mutually contacting portions by ultrasonic welding.

5. The hydrostatic gas bearing according to claim 1, wherein the outer peripheral surface of the annular protruding portion of said bearing base has a cylindrical outer wall surface, an annular truncated conical outer wall surface which is gradually enlarged in diameter outwardly from the cylindrical outer wall surface in such a manner as to continue from the cylindrical outer wall surface, and a cylindrical outer wall surface larger in diameter than the cylindrical outer wall surface and continuous from the one surface of the base portion in such a manner as to continue from the truncated conical outer wall surface, while the inner peripheral surface of the annular protruding portion of said bearing base has a cylindrical inner wall surface, an annular truncated conical inner wall surface which is gradually reduced in diameter inwardly from the cylindrical inner wall surface in such a manner as to continue from the cylindrical inner wall surface, and a cylindrical inner wall surface smaller in diameter than the cylindrical inner wall surface and continuous from the one surface of the base portion in such a manner as to continue from the truncated conical inner wall surface, wherein the outer-side inner peripheral surface defining the annular recessed portion of said bearing body includes an outer cylindrical inner wall surface and an outer truncated conical inner wall surface which is gradually enlarged in diameter from the outer cylindrical inner wall surface and has an annular peripheral edge defining an outer edge of an open end of the annular recessed portion, while the inner-side inner peripheral surface defining the annular recessed portion of said bearing body includes an inner cylindrical inner wall surface and an inner truncated conical inner wall surface which is gradually reduced in diameter from the inner cylindrical inner wall surface and has an annular peripheral edge defining an inner edge of the open end of the annular recessed portion, and wherein said bearing body is arranged such that the outer cylindrical inner wall surface and the inner cylindrical inner wall surface are respectively fitted to the cylindrical outer wall surface of the outer peripheral surface of the annular protruding portion and the cylindrical inner wall surface of the inner peripheral surface of the annular protruding portion, and the outer truncated conical inner wall surface and the inner truncated conical inner wall surface are respectively brought into contact with the truncated conical outer wall surface and the truncated conical inner wall surface, and said bearing body is integrated with said bearing base by being welded and joined together at mutually contacting portions by ultrasonic welding.

6. The hydrostatic gas bearing according to claim 1, wherein said bearing body has, in addition to the annular recessed groove, a large-diameter annular recessed groove which is formed in the one surface of said bearing body and is disposed on an outer side of the annular recessed groove in such a manner as to surround the annular recessed groove; a plurality of first radial recessed grooves each having one end portion open to the annular recessed groove and another end portion open to the large-diameter annular recessed groove; a small-diameter annular recessed groove which is formed on an inner side of the annular recessed groove; and a plurality of second radial recessed grooves each having one end portion open to the annular recessed groove and another end portion open to the small-diameter annular recessed groove.

7. A method of manufacturing a hydrostatic gas bearing comprising the steps of:
(a) preparing a synthetic resin-made bearing base having a base portion, an annular protruding portion provided integrally on and protruding from one surface of the base portion, and an air supply passage which is provided in the annular protruding portion and the base portion and which has one end open at a protruding end face of the annular protruding portion and another end open at an outer peripheral surface of the base portion, wherein an outer peripheral surface of the annular protruding portion has a cylindrical outer wall surface, an annular truncated conical outer wall surface which is gradually enlarged in diameter outwardly from the cylindrical outer wall surface in such a manner as to continue from the cylindrical outer wall surface, and a cylindrical outer wall surface larger in diameter than the cylindrical outer wall surface and continuous from the one surface of the base portion in such a manner as to continue from the truncated conical outer wall surface, while an inner peripheral surface of the annular protruding portion has a cylindrical inner wall surface, an annular truncated conical inner wall surface which is gradually reduced in diameter inwardly from the cylindrical inner wall surface in such a manner as to continue from the cylindrical inner wall surface, and a cylindrical inner wall surface smaller in diameter than the cylindrical inner wall surface and continuous from the one surface of the base portion in such a manner as to continue from the truncated conical inner wall surface;
(b) preparing a synthetic resin-made bearing body having an annular recessed portion which is formed in one surface of the bearing body, an annular recessed groove which is open at another surface of the bearing body, and a plurality of air outlet holes each of which communicates with the annular recessed groove at one end thereof and opens to the annular recessed portion at another end thereof, wherein an outer-side inner peripheral surface defining the annular recessed portion includes an outer cylindrical inner wall surface having an annular peripheral edge defining an outer edge of an open end of the annular recessed portion, while an inner-side inner peripheral surface defining the annular recessed portion has an inner cylindrical inner wall surface having an annular peripheral edge defining an inner edge of the open end of the annular recessed portion;
(c) causing the one surface of said bearing body to oppose the one surface of the base portion, causing the annular recessed portion of said bearing body to receive the annular protruding portion of said bearing base, and causing the annular peripheral edge of the outer cylindrical inner wall surface defining the outer edge of the open end of the annular recessed portion and the annular peripheral edge of the inner cylindrical inner wall surface defining the inner edge of the open end of the annular recessed portion to be respectively brought into contact with the truncated conical outer wall surface of the outer peripheral surface of the annular protruding portion and the truncated conical inner wall surface of the inner peripheral surface of the annular protruding portion, so as to form an assembly of said bearing body and said bearing base;
(d) welding and joining said bearing body to said bearing base at portions of the contact by pressing a tool horn against said bearing body in the assembly and by imparting ultrasonic vibrations thereto under welding conditions of a welding pressure of 0.098 to 0.60 MPa, a vibrational amplitude of 20 to 80 μm, an emitting time of 0.1 to 1.5 seconds, and a hold time of 0.5 to 1.0 second; and
(e) irradiating the other surface of said bearing body welded and joined to said bearing base with a laser beam to thereby form the annular recessed groove with a width of at least 0.3 mm and a depth of at least 0.01 mm and the plurality of air outlet holes serving as inherent restrictors each of which communicates with the annular recessed groove at the one end thereof, opens to the annular recessed portion at the another end thereof, and has a diameter of at least 30 μm at the one end.

8. The method of manufacturing a hydrostatic gas bearing according to claim 7, comprising the step of irradiating the other surface of said bearing body welded and joined to said bearing base with a laser beam to thereby form the annular recessed groove with a width of at least 0.3 mm or 0.3 to 1.0 mm and a depth of at least 0.01 mm or 0.01 to 0.1 mm and the plurality of air outlet holes each of which communicates with the annular recessed groove at the one end thereof, opens to the annular recessed portion at the another end thereof, and has a diameter of at least 30 μm or 30 to 120 μm at the one end.

9. A method of manufacturing a hydrostatic gas bearing comprising the steps of:
(a) preparing a synthetic resin-made bearing base having a base portion, an annular protruding portion provided integrally on and protruding from one surface of the base portion, and an air supply passage which is provided in the annular protruding portion and the base portion and which has one end open at a protruding end face of the annular protruding portion and another end open at an outer peripheral surface of the base portion, wherein an outer peripheral surface of the annular protruding portion has a cylindrical outer wall surface, an annular truncated conical outer wall surface which is gradually enlarged in diameter outwardly from the cylindrical outer wall surface in such a manner as to continue from the cylindrical outer wall surface, and a cylindrical outer wall surface larger in diameter than the cylindrical outer wall surface and continuous from the one surface of the base portion in such a manner as to continue from the truncated conical outer wall surface, while an inner peripheral surface of the annular protruding portion has a cylindrical inner wall surface, an annular truncated conical inner wall surface which is gradually reduced in diameter inwardly from the cylindrical inner wall surface in such a manner as to continue from the cylindrical inner wall surface, and a cylindrical inner wall surface smaller in diameter than the cylindrical inner wall surface and continuous from the one surface of the base portion in such a manner as to continue from the truncated conical inner wall surface;

(b) preparing a synthetic resin-made bearing body having an annular recessed portion which is formed in one surface of the bearing body, an annular recessed groove which is open at another surface of the bearing body, and a plurality of air outlet holes each of which communicates with the annular recessed groove at one end thereof and opens to the annular recessed portion at another end thereof, wherein an outer-side inner peripheral surface defining the annular recessed portion includes an outer cylindrical inner wall surface and an outer truncated conical inner wall surface which is gradually enlarged in diameter from the outer cylindrical inner wall surface and has an annular peripheral edge defining an outer edge of an open end of the annular recessed portion, while an inner-side inner peripheral surface defining the annular recessed portion includes an inner cylindrical inner wall surface and an inner truncated conical inner wall surface which is gradually reduced in diameter from the inner cylindrical inner wall surface and has an annular peripheral edge defining an inner edge of the open end of the annular recessed portion;

(c) causing the one surface of said bearing body to oppose the one surface of the base portion, causing the annular recessed portion of said bearing body to receive the annular protruding portion of said bearing base, and causing the outer truncated conical inner wall surface and the inner truncated conical inner wall surface to be respectively brought into contact with the truncated conical outer wall surface and the truncated conical inner wall surface, so as to form an assembly of said bearing body and said bearing base;

(d) welding and joining said bearing body to said bearing base at portions of the contact by pressing a tool horn against said bearing body in the assembly and by imparting ultrasonic vibrations thereto under welding conditions of a welding pressure of 0.098 to 0.60 MPa, a vibrational amplitude of 20 to 80 µm, an emitting time of 0.1 to 1.5 seconds, and a hold time of 0.5 to 1.0 second; and (e) irradiating the other surface of said bearing body welded and joined to said bearing base with a laser beam to thereby form the annular recessed groove with a width of at least 0.3 mm and a depth of at least 0.01 mm and the plurality of air outlet holes serving as inherent restrictors each of which communicates with the annular recessed groove at the one end thereof, opens to the annular recessed portion at the another end thereof, and has a diameter of at least 30 µm at the one end.

* * * * *